(12) United States Patent
Harter

(10) Patent No.: US 11,772,482 B2
(45) Date of Patent: Oct. 3, 2023

(54) AIR GUIDING ELEMENT

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 17 days.

(21) Appl. No.: 17/746,009

(22) Filed: May 17, 2022

(65) Prior Publication Data

US 2022/0371668 A1  Nov. 24, 2022

(30) Foreign Application Priority Data

May 21, 2021 (DE) ...................... 10 2021 113 235.5

(51) Int. Cl.
*B60K 11/08* (2006.01)
*B62D 35/00* (2006.01)

(52) U.S. Cl.
CPC .......... *B60K 11/085* (2013.01); *B62D 35/005* (2013.01)

(58) Field of Classification Search
CPC .... B62D 35/00; B62D 35/005; B62D 35/008; B60K 11/04; B60K 11/08; B60K 11/085

USPC ............................................ 296/180.2, 180.5
See application file for complete search history.

(56) References Cited

U.S. PATENT DOCUMENTS

| 10,953,933 | B2 * | 3/2021 | Schmitt ................ B62D 35/005 |
| 11,433,760 | B2 * | 9/2022 | Solazzo .................... F01P 7/10 |
| 2009/0130968 | A1 | 5/2009 | Harich et al. |
| 2021/0122433 | A1 * | 4/2021 | Solazzo ................ H02J 50/001 |

FOREIGN PATENT DOCUMENTS

| DE | 102005009203 A1 | 8/2006 | |
| DE | 102017105568 A1 * | 9/2018 | ............. B60K 11/08 |
| DE | 102021117280 A1 * | 1/2023 | ............. B60K 11/04 |
| FR | 3100585 A1 * | 3/2021 | ............. B60K 11/04 |

\* cited by examiner

*Primary Examiner* — Jason S Daniels
(74) *Attorney, Agent, or Firm* — RatnerPrestia

(57) ABSTRACT

An air guiding element, in particular a cooling air louver for an air inlet of a motor vehicle body, with a flat main body and with a bearing region. The air guiding element is arranged such that it can be pivoted by way of its bearing region about a pivot axis. The flat main body is formed from two shells, and with a carrier element which is arranged between the shells. The carrier element is molded between the two shells by an injection molding method such that the two shells are connected to one another in this way.

11 Claims, 2 Drawing Sheets

AIR GUIDING ELEMENT

CROSS-REFERENCE TO RELATED APPLICATION

This application claims priority to German Patent Application Serial No.: 10 2021 113 235.5, filed May 21, 2021, the content of such application being incorporated by reference herein in its entirety.

FIELD OF THE INVENTION

The invention relates to an air guiding element, in particular a cooling air louver for an air inlet of a motor vehicle body.

BACKGROUND OF THE INVENTION

In the case of motor vehicles, cooling air louvers on an air inlet of a motor vehicle body are known. Cooling air louvers of this type are configured such that they are connected in part fixedly to the front part of the motor vehicle body and are a rigid component of the front part. Movable cooling air louvers are also known which can be pivoted about a longitudinal axis and which can close or open a cooling air opening. For example, cooling air louvers of this type are known which are arranged so as to lie horizontally in a cooling air opening, can be pivoted about a longitudinal axis, and are mounted pivotably on the lateral edges of the cooling air opening. Cooling air louvers of this type are also known which are arranged upright vertically in a cooling air opening, can be pivoted about a longitudinal axis, and are mounted pivotably on the upper and lower edges of the cooling air opening. It occurs here that the cooling air louver protrudes in a vane-like manner from the rotational axis and lies in the headwind. Accordingly, the cooling air louver has to be a structurally highly stable configuration, with the result that it withstands the wind forces even at high driving speeds. At the same time, the cooling air louver also has to satisfy visual requirements, in particular with regard to black tones, the color stability over time, the gloss level and the UV resistance. For this reason, the known cooling air louvers consist of a carrier part made from a stable plastic material, for example PP-GF50, which cannot satisfy the visual requirements, however, and a panel which consists of a plastic material which satisfies the visual requirements, for example PP-T20, but does not have the necessary stability.

Accordingly, the carrier part and the panel are connected to one another, in order to provide a visually appealing component with the necessary stability properties. This can have the disadvantage, however, that the carrier part is also visible in some pivoting positions of the cooling air louver, which is not desired because it does not satisfy the visual requirements. Producing the cooling air louver only from the visually suitable material, in contrast, is not possible because this would not satisfy the stability requirements, for example at high vehicle speeds or in a car wash with contact with the rotating washing brushes.

SUMMARY OF THE INVENTION

Described herein is an air guiding element which satisfies the visual properties of a component of this type and at the same time also fulfills the stability requirements. Also described herein is a method for producing an air guiding element, which method is effective and inexpensive and allows an air guiding element which is suitable with regard to stability and visual appearance to be provided.

One exemplary embodiment of the invention relates to an air guiding element, in particular a cooling air louver for an air inlet of a motor vehicle body, with a flat main body and with a bearing region, it being possible for the air guiding element to be arranged such that it can be pivoted by way of its bearing region about a pivot axis, the flat main body being formed from two shells, and with a carrier element which is arranged between the shells, the carrier element being molded between the two shells by means of an injection molding method, and the two shells being connected to one another in this way. As a result, an integrated component is provided as an air guiding element which satisfies the visual requirements and also has the necessary stability as a result of the injection molded carrier element. Here, the carrier element serves as a type of reinforcement and supports the shells which are not of sufficiently stable configuration per se. The injection molding method produces an integrated component which can be produced effectively and therefore also inexpensively by way of a small number of steps.

It is particularly advantageous if the injection molding method is an assembly injection molding method or a hollow chamber injection molding method, with the result that the carrier element can be injected into a cavity between the two shells. This allows a particularly effective method of production of the air guiding element, without complicated further assembly steps being necessary. It is particularly advantageous if both the two shells and the carrier part can be injected in a mold, the two shells first of all being injected separately from one another, the two shells then being joined with the formation of a cavity, and the carrier part subsequently being injected into the cavity between the two shells.

It is also particularly advantageous if the bearing region is part of at least one of the two shells, or is configured in one piece with at least one of the two shells. Here, the bearing region which serves to move the air guiding element, in particular the pivoting, and supports, for example, the rotational axis, can be formed by one shell or by the two shells, in particular also with the involvement of the carrier element. The bearing region can thus also achieve its necessary stability.

It is also advantageous if the carrier element is of frame-like configuration between the two shells. As a result, the carrier element can form a stable support on its frame-like region, and can configure a clearance within the frame-like region for weight reduction.

It is particularly advantageous if the carrier element is configured between the two shells as a substantially rectangular frame with two first limbs which lie opposite one another and with two second limbs which lie opposite one another. Here, the first limbs are preferably arranged at a right angle with respect to the second limbs. A stable design is thus achieved which is preferably arranged close to the outer edge of the shells and runs in a stabilizing and supporting manner there.

It is also advantageous if the gate of the carrier element has a structural functional design. As a result, the outwardly protruding and also visible gate of the carrier element can be given an additional task which would otherwise have to be undertaken in some other way, which leads to a further function of the gate and to it being possible for further parts to be saved.

It is also expedient if the structural functional design configures a receptacle for a push rod, a bearing bush and/or a gearwheel. The gate which otherwise tends to be undesired therefore has a further function which can be utilized as a type of receptacle for further elements.

It is particularly advantageous if the two shells consist of a first plastic material, for example of a polypropylene PP-T20. As a result, the shells can be produced from a visually appealing material which, however, does not absolutely have to satisfy the criteria of stability.

It is also advantageous if the carrier element consists of a second plastic material, for example of a polypropylene PP-GF30. The material of the carrier element as reinforcement can be produced from a material which has the necessary stability, with the result that, together with the two shells, it ensures the overall stability of the component.

One exemplary embodiment of the invention relates to a method for producing an air guiding element, first of all the two shells being produced in an injection molding method, subsequently the two shells being joined together leaving a cavity, and subsequently the carrier element being injected between the two shells in an injection molding method, in particular an assembly injection molding method or hollow chamber injection molding method.

BRIEF DESCRIPTION OF THE DRAWING FIGURES

In the following text, the invention will be described in detail on the basis of one exemplary embodiment with reference to the drawing, in which.

DETAILED DESCRIPTION OF THE INVENTION

Figure 1:
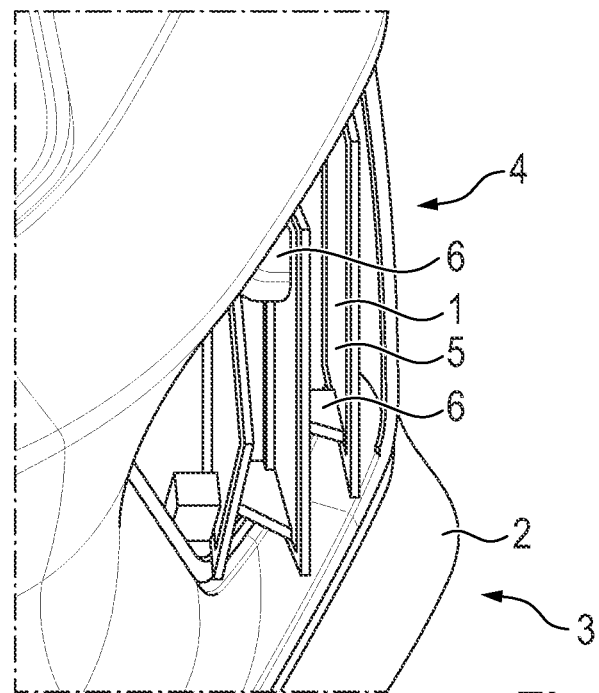
FIG. 1 shows a diagrammatic partial illustration of a front part of a motor vehicle body with a cooling air opening and air guiding elements according to the prior art which are arranged therein.

FIG. 1 shows a diagrammatic partial illustration of a front part 2 of a motor vehicle body 3 with a cooling air opening 4, such as an air inlet, and an arrangement of air guiding elements 1 according to the prior art. These air guiding elements 1 have a main body 5 and a bearing region 6, and are arranged pivotably in the cooling air opening 4. Here, an actuator (not shown) is provided, in order to pivot and adjust the air guiding elements 1 between a first operating position which opens the cooling air opening 4 and a second operating position which closes the cooling air opening 4. The air guiding elements 1 are mounted by way of the bearing region 6 on the front part 2, on which the actuator also acts for pivoting purposes.

Figure 2:
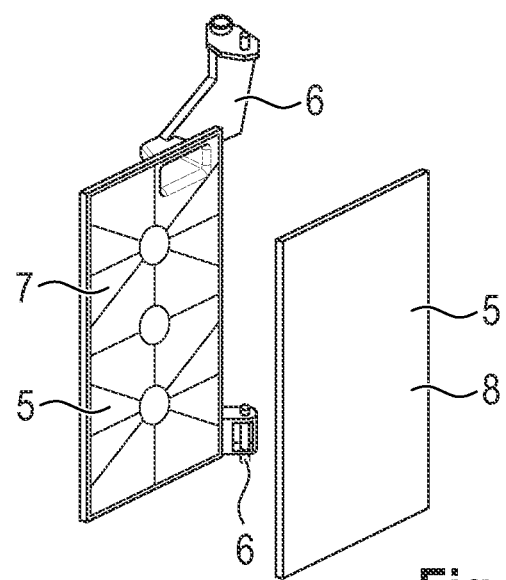
FIG. 2 shows a diagrammatic illustration of the air guiding element according to the prior art with its individual parts.

FIG. 2 shows that the respective air guiding element 1 according to the prior art consists of a carrier element 7 and of a panel 8, the carrier element 7 and the panel 8 being connected flatly to one another, and the panel 8 being arranged such that it is visible toward the front, while the carrier element 7 is arranged on the rear side. Here, however, the carrier element 7 is likewise readily visible in the first operating position.

Together with the panel 8, the carrier element 7 configures the main body 5, with the result that the carrier element 7 provides the necessary stability on account of its shape and its material, but is not sufficient with regard to visual requirements. To this end, the carrier element 7 is covered on one side with the panel 8 which, although it does not satisfy the stability requirements, satisfies the visual requirements. In the example which is shown, the panel 8 is latched to the carrier element 7. In order to achieve the stability, the carrier element 7 is of flat configuration and has the entire flat contour of the air guiding element 1, the panel 8 covering the flat part of the carrier element 7 on the side.

Figure 3:
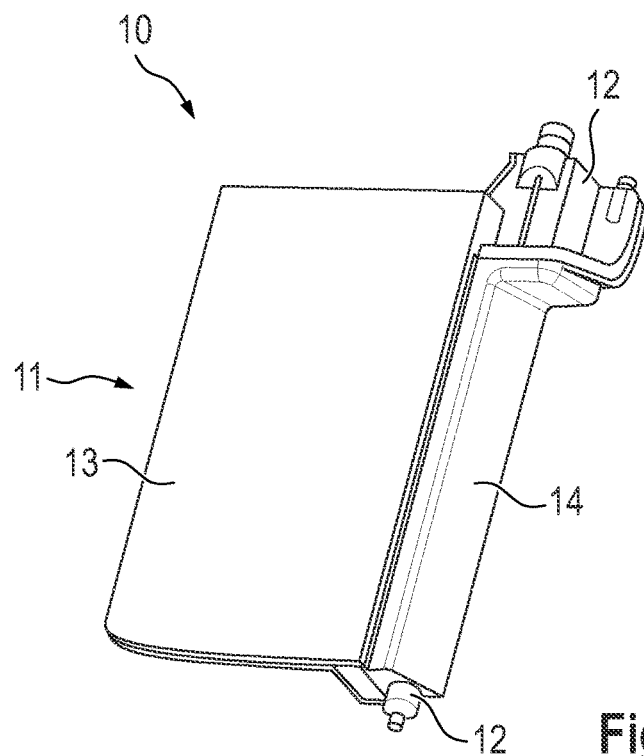
FIG. 3 shows a diagrammatic view of an air guiding element according to aspects of the invention.
Figure 4:
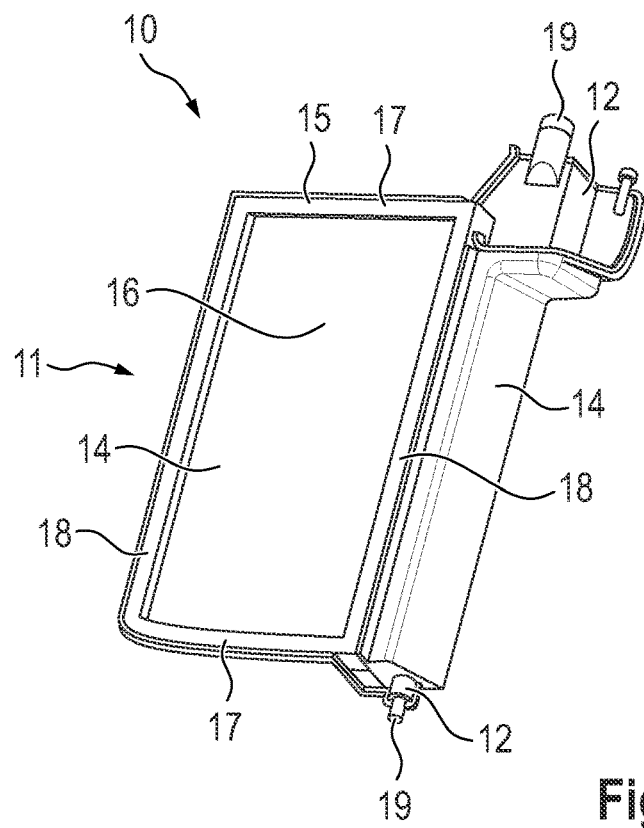
FIG. 4 shows a diagrammatic partial illustration of the air guiding element with a shell and an inner injection molded carrier element.

FIGS. 3 and 4 show one exemplary embodiment of an air guiding element 10 according to aspects of the invention which satisfies the visual requirements in every operating position and at the same time also satisfies the requirements of stability.

The air guiding element 10 according to aspects of the invention, in particular a cooling air louver for an air inlet, such as a cooling air opening 4, of a motor vehicle body 3, can be used in the arrangement of FIG. 1, with the result that reference is made in this regard to the description of the motor vehicle body 3 and the cooling air opening 4 of the front part 2 according to FIG. 1.

The air guiding element 10 has a flat main body 11 which is intended to influence the conduction of air. A bearing region 12 which protrudes on both sides of the main body 11 is arranged on the main body 11.

The bearing region 12 serves for it to be possible for the air guiding element 10 to be arranged such that it can be pivoted by means of the bearing region 12 about a pivot axis.

The flat main body 11 is formed from two shells 13, 14, a carrier element 15 being arranged between the two shells 13, 14, which carrier element 15 is injected by means of an injection molding method between the two shells 13, 14, and the two shells 13, 14 being connected to one another in this way.

The two shells 13, 14 are of substantially flat configuration and lie next to one another or bear against one another with the preservation of a cavity 16, and are advantageously produced from plastic. After production of the two shells 13, 14, they are arranged with retention of the cavity 16, and the material of the carrier element 15 is subsequently injected into the cavity 16 in an injection molding method, in particular in an assembly injection molding method or a hollow chamber injection molding method, with the result that the carrier element 15 is formed such that it is connected to the two shells 13, 14. As a result, a highly stable connection is produced between the two shells 13, 14 and the injected carrier element 15.

It is also apparent from FIGS. 3 and 4 that the bearing region 12 is part of at least one of the two shells 13, 14 or is configured in one piece with at least one of the two shells 13, 14. The carrier element 15 can also be part of the bearing region 12, as FIG. 4 shows.

It is likewise apparent from FIG. 4 that the carrier element 15 is of frame-like configuration between the two shells 13, 14. Here, the term "frame-like" means that the component is not configured over a full area, but rather forms a frame which is, in particular, peripheral and leaves a central area free, in order for it to be possible for material and weight to be saved.

Accordingly, the carrier element 15 can be configured between the two shells 13, 14 as a substantially rectangular frame with two first limbs 17 which lie opposite one another and with two second limbs 18 which lie opposite one another. The first limbs 17 are preferably at a right angle with respect to the second limbs 18.

It is also advantageous in the case of this refinement if the gate 19 of the carrier element 15 optionally has a structural functional design. Here, the gate 19 can be configured as a structural functional design as a receptacle for a push rod, a bearing bush and/or a gearwheel, with the result that, beyond its original function during injection molding, the gate 19 also has a structural function which remains afterward.

The two shells 13, 14 are preferably optionally produced from a first plastic material, for example from a polypropylene PP-T20.

Furthermore, it is also optional if the carrier element 15 consists of a second plastic material, for example of a polypropylene PP-GF30.

Here, a method for producing an air guiding element 10 can provide that first of all the two shells 13, 14 are produced in an injection molding method, subsequently the two shells 13, 14 are joined together leaving a cavity 16, and subsequently the carrier element 15 is injected between the two shells 13, 14 in an injection molding method, in particular an assembly injection molding method or hollow chamber injection molding method. This firstly produces the carrier element 15 for stabilizing the air guiding element 10, and secondly at the same time connects the two shells 13, 14 to the carrier element 15 to form a stable structural unit.

List of Designations

1 Air guiding element
2 Front part
3 Motor vehicle body
4 Cooling air opening
5 Main body
6 Bearing region
7 Carrier element
8 Panel
10 Air guiding element
11 Main body
12 Bearing region
13 Shell
14 Shell
15 Carrier element
16 Cavity
17 First limb
18 Second limb
19 Gate

What is claimed:

1. An air guiding element for an air inlet of a motor vehicle body, said air guiding element comprising:
a flat main body having a bearing region, the air guiding element being configured to pivot on the bearing region about a pivot axis, the flat main body including two shells that are connected to one another and a carrier element which is both arranged and molded between the shells.

2. The air guiding element as claimed in claim 1, wherein the air guiding element is produced by an assembly injection molding process or a hollow chamber injection molding process.

3. The air guiding element as claimed in claim 1, wherein the bearing region is part of at least one of the two shells, or is configured in one piece with at least one of the two shells.

4. The air guiding element as claimed in claim 1, wherein the carrier element is configured between the two shells as a substantially rectangular frame.

5. The air guiding element as claimed in claim 1, wherein the carrier element is configured between the two shells as a substantially rectangular frame with two first limbs which lie opposite one another and with two second limbs which lie opposite one another.

6. The air guiding element as claimed in claim 1 further comprising a gate of the carrier element.

7. The air guiding element as claimed in claim 6, wherein the gate comprises a receptacle for a push rod, a bearing bush and/or a gearwheel.

8. The air guiding element as claimed in claim 1, wherein the two shells comprise a first plastic material.

9. The air guiding element as claimed in claim 8, wherein the carrier element comprises a second plastic material that differs from the first plastic material.

10. The air guiding element as claimed in claim 9, wherein the first plastic material is polypropylene PP-T20 and the second plastic material is polypropylene PP-GF30.

11. A method for producing an air guiding element including a flat main body having a bearing region, the air guiding element being configured to pivot on the bearing region about a pivot axis, the flat main body including two shells that are connected to one another and a carrier element arranged between the shells, said method comprising:
injection molding the two shells;
following the injection molding step, joining together the two shells together leaving a cavity therebetween; and
following the joining step, injecting the carrier element between the two shells in either an assembly injection molding method or a hollow chamber injection molding method.

* * * * *